United States Patent
Rankin et al.

(10) Patent No.: US 11,729,184 B2
(45) Date of Patent: Aug. 15, 2023

(54) DETECTING COVERTLY STORED PAYLOADS OF DATA WITHIN A NETWORK

(71) Applicant: Rankin Labs, LLC, Williamsport, OH (US)

(72) Inventors: John Rankin, Williamsport, OH (US); Barry Boyer, Circleville, OH (US)

(73) Assignee: Rankin Labs, LLC, Williamsport, OH (US)

( * ) Notice: Subject to any disclaimer, the term of this patent is extended or adjusted under 35 U.S.C. 154(b) by 0 days.

(21) Appl. No.: 17/368,498

(22) Filed: Jul. 6, 2021

(65) Prior Publication Data

US 2021/0344687 A1    Nov. 4, 2021

Related U.S. Application Data

(63) Continuation-in-part of application No. 16/885,783, filed on May 28, 2020, now Pat. No. 11,055,166.

(60) Provisional application No. 62/853,294, filed on May 28, 2019.

(51) Int. Cl.
*G06F 11/00* (2006.01)
*H04L 9/40* (2022.01)
*G06F 11/30* (2006.01)

(52) U.S. Cl.
CPC .......... *H04L 63/1408* (2013.01); *G06F 11/30* (2013.01); *G06F 11/3027* (2013.01); *G06F 11/3058* (2013.01); *H04L 63/1425* (2013.01)

(58) Field of Classification Search
CPC ............. G06F 11/0709; G06F 11/0775; G06F 11/0751; G06F 11/30; G06F 11/3058
See application file for complete search history.

(56) References Cited

U.S. PATENT DOCUMENTS

| | | |
|---|---|---|
| 3,688,090 A | 8/1972 | Rankin |
| 6,023,724 A | 2/2000 | Bhatia et al. |
| 6,567,416 B1 | 5/2003 | Chuah |
| 6,714,985 B1 | 3/2004 | Malagrino et al. |
| 6,757,248 B1 | 6/2004 | Li et al. |
| 7,103,025 B1 | 9/2006 | Choksi |
| 8,090,866 B1 | 1/2012 | Bashyam et al. |
| 8,131,281 B1 | 3/2012 | Hildner et al. |
| 8,374,091 B2 | 2/2013 | Chiang |
| 8,397,151 B2 | 3/2013 | Salgado et al. |
| 8,577,038 B2 | 11/2013 | Kameda et al. |
| 8,730,966 B2 | 5/2014 | Awano |
| 8,737,198 B1 | 5/2014 | Holness et al. |
| 9,203,755 B1 * | 12/2015 | Wong .................. H04L 43/0829 |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Charles Ehne

(74) *Attorney, Agent, or Firm* — Standley Law Group LLP; Jeffrey S. Standley; Adam J. Smith

(57) ABSTRACT

System and methods for detecting covert payloads of data within an IP network are provided. Activity of at least a portion of the IP network is monitored for datagrams comprising error messages. A selection of the datagrams including the error messages occurring with a regularity above a predetermined threshold are identified.

21 Claims, 4 Drawing Sheets

SHORT TERM STORAGE ILLUSTRATION

(56) References Cited

U.S. PATENT DOCUMENTS

| | | |
|---|---|---|
| 9,350,663 B2 | 5/2016 | Rankin |
| 9,626,522 B1 | 4/2017 | Flowers, Jr. |
| 10,728,220 B2 | 7/2020 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2002/0114341 A1 | 8/2002 | Sutherland et al. |
| 2002/0164024 A1 | 11/2002 | Arakawa et al. |
| 2003/0031198 A1 | 2/2003 | Currivan et al. |
| 2003/0056009 A1 | 3/2003 | Mizrachi et al. |
| 2003/0223582 A1 | 12/2003 | Dagan |
| 2004/0210763 A1 | 10/2004 | Jonas |
| 2005/0058129 A1 | 3/2005 | Jones et al. |
| 2005/0060538 A1 | 3/2005 | Beverly |
| 2005/0105506 A1 | 5/2005 | Birdwell et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2007/0025388 A1 | 2/2007 | Abhishek et al. |
| 2007/0028121 A1 | 2/2007 | Hsieh |
| 2007/0223395 A1 | 9/2007 | Lee et al. |
| 2007/0283125 A1 | 12/2007 | Manczak et al. |
| 2008/0082661 A1* | 4/2008 | Huber ............... H04L 41/0681 709/224 |
| 2008/0084863 A1 | 4/2008 | Springer |
| 2008/0104313 A1 | 5/2008 | Chu |
| 2008/0317030 A1 | 12/2008 | Rhee et al. |
| 2009/0046717 A1 | 2/2009 | Li |
| 2009/0110003 A1 | 4/2009 | Julien et al. |
| 2010/0103830 A1 | 4/2010 | Salgado et al. |
| 2010/0281257 A1 | 11/2010 | Yamazaki et al. |
| 2011/0064088 A1 | 3/2011 | Kawarai et al. |
| 2011/0149891 A1 | 6/2011 | Ramakrishna |
| 2011/0231630 A1 | 9/2011 | Nowski et al. |
| 2011/0238793 A1 | 9/2011 | Bedare et al. |
| 2012/0117376 A1 | 5/2012 | Fink et al. |
| 2012/0243539 A1 | 9/2012 | Keesara |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0166701 A1 | 6/2013 | Todorov et al. |
| 2014/0225806 A1 | 1/2014 | Robitaille et al. |
| 2014/0100014 A1 | 4/2014 | Bennett, III et al. |
| 2014/0173085 A1* | 6/2014 | Gupta .................... H04W 8/04 709/224 |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0113028 A1 | 4/2015 | Boppana et al. |
| 2015/0229714 A1 | 8/2015 | Venkatsubra et al. |
| 2015/0381408 A1 | 12/2015 | Kompella |
| 2016/0077976 A1 | 3/2016 | Raikin et al. |
| 2016/0171399 A1 | 6/2016 | Santhanam et al. |
| 2016/0241388 A1 | 8/2016 | Ross |
| 2016/0269294 A1 | 9/2016 | Rankin |
| 2016/0366160 A1 | 12/2016 | Kapoor et al. |
| 2017/0012951 A1 | 1/2017 | Mennes et al. |
| 2017/0041296 A1 | 2/2017 | Ford et al. |
| 2017/0090872 A1 | 3/2017 | Mathew et al. |
| 2017/0310544 A1 | 10/2017 | Woodward et al. |
| 2017/0351575 A1 | 12/2017 | Baker et al. |
| 2018/0018147 A1 | 1/2018 | Sugawara |
| 2018/0102975 A1 | 4/2018 | Rankin |
| 2018/0198642 A1 | 7/2018 | Regev et al. |
| 2020/0204343 A1 | 6/2020 | Rankin |
| 2020/0233668 A1 | 7/2020 | Rankin |
| 2020/0236026 A1 | 7/2020 | Rankin |
| 2020/0241960 A1 | 7/2020 | Yanovsky et al. |
| 2020/0334168 A1 | 10/2020 | Rankin |
| 2020/0358791 A1 | 11/2020 | Rankin |
| 2021/0344687 A1 | 11/2021 | Rankin et al. |
| 2022/0091992 A1 | 3/2022 | Shanbhogue et al. |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Arkin, O., ICMP Usage in Scanning, Sys-Security Group, Jun. 2001.

Mistree, B., PingFS, https://bmistree.com/pingfs/, pp. 1-27, Dec. 5, 2019.

Thyer, J., Covert Data Storae Channel Using IP Packet Headers, SANS Institute, Information Security Reading Room, Jan. 30, 2008.

Brown, J. et al., ARP Coaching Poisoning Routing Loops in ad Hoc Networks, Mobile Networks and Applications, pp. 1306-1371, 2018.

Hansen, R. et al., Covert6: A Tool to Corroborate the Existence of IPv6 Covert Channels, Annual ADFSL Conference on Digital Forensics, Security Law, 2016.

Mileva, A. et al., Covert Channels in TCP/IP Protocol Stack—extended version-, Central European Journal of Computer Science, 2000.

York, D., Flooding Attack, Science Direct, 2021.

\* cited by examiner

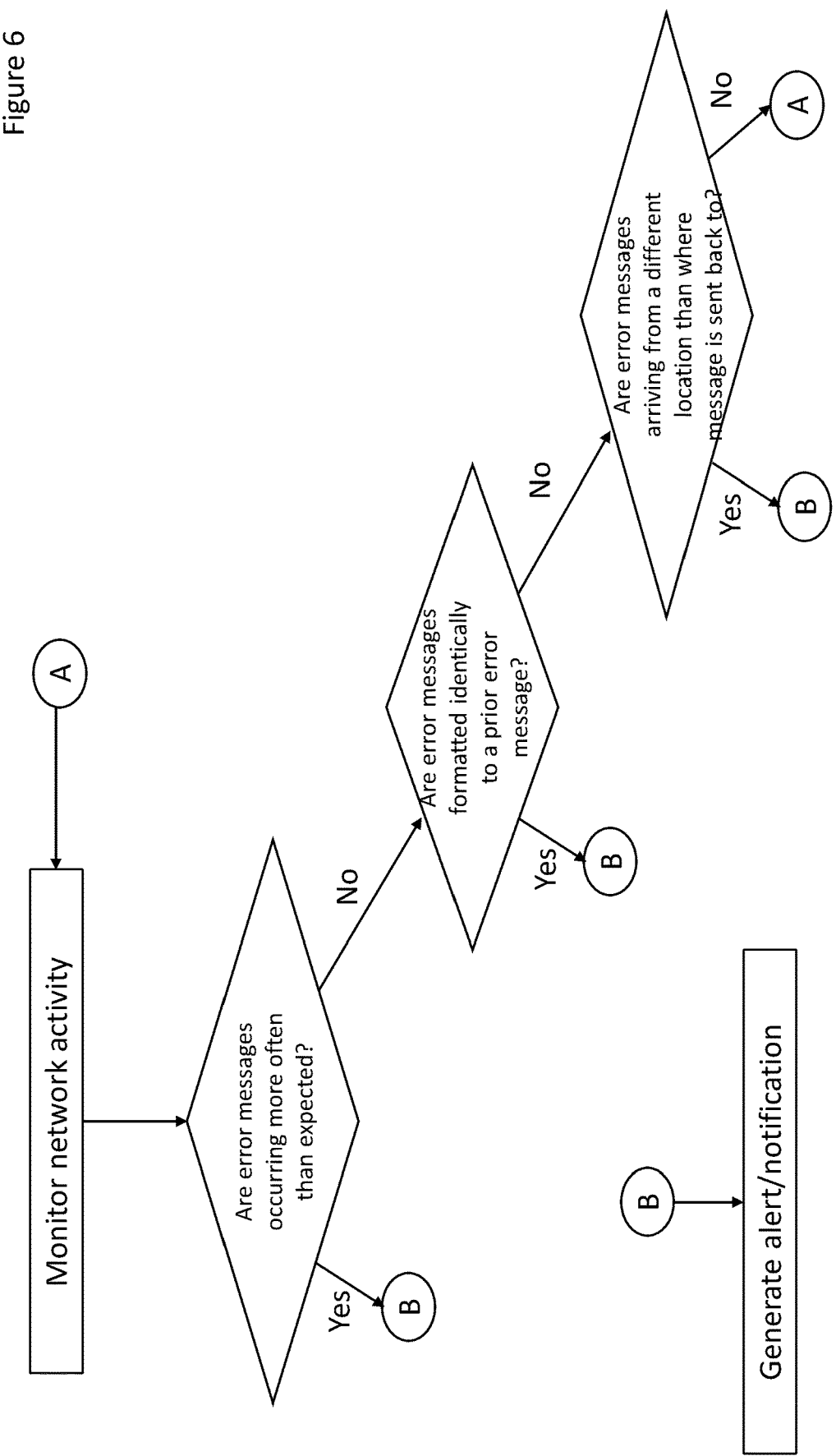

DETECTING COVERTLY STORED PAYLOADS OF DATA WITHIN A NETWORK

CROSS-REFERENCE TO RELATED APPLICATIONS

This application is a continuation-in-part of U.S. patent application Ser. No. 16/885,783 filed May 28, 2020, which claims the benefit of U.S. Provisional Patent Application Ser. No. 62/853,294 filed May 28, 2019, the disclosures of each of which are hereby incorporated by reference as if fully restated herein.

TECHNICAL FIELD

Exemplary embodiments relate generally to systems and methods for covertly storing a payload of data within a network and detecting such covertly stored payloads of data.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use, and manage the Internet with the goal of improving its operations and efficiencies. These documents include protocol standards, best current practices, and information updates of various kinds, and are commonly referred to as Request for Comments (RFC).

TCP can be used to establish a bi-directional connection between two clients wherein activity begins with a request for information made by one client to another client. A "client" may be any program or application that initiates requests for, or sends information from, one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon—also often referred to interchangeably as a server or service—is generally a software component of a device that runs a background process. The term "daemon" may refer to a component of a networked device that sends (source daemon) or receives (destination daemon), and processes communications between remote clients according to the TCP standard.

A host is a device or system that runs or executes TCP/IP daemons. The term "host" may refer to any device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, the TCP software breaks the data stream into smaller pieces called segments (sometimes referred to as datagrams, fragments, or packets generally) for transmission to a requesting client. The protocol calls for the use of checksums, sequence numbers, timestamps, timeout counters and retransmission algorithms to ensure reliable data transmission.

The IP layer actually performs the communication function between two networked hosts. The IP software receives data segments from the TCP layer, ensures that the segment is sized properly to meet the requirements of the transmission path and physical adapters (such as Ethernets and CTCs). The IP software changes the segment size, if necessary, by breaking the segment down into smaller IP datagrams, and transmits the data to the physical network interface or layer of the host.

The network connecting devices are often called gateways. These gateways communicate between themselves for control purposes. Occasionally, a gateway or destination host will communicate with a source host, for example, to report an error in datagram processing. For such purposes the Internet Control Message Protocol (ICMP) is used.

The protocols that make up and control an IP Network are strictly adhered to in order to maintain proper functionality of the network. A minimum of responsible and effective implementation is expected from any given host implementation. While layers of Internet protocols may be designed for error recovery and effective communication, it is possible to utilize these same designs for alternative means without requiring alterations.

The IP protocol RFC 791 provides for the concept of datagram fragmentation. A fully formed datagram that has a length which exceeds the transmission requirements of the network must be broken into smaller pieces at the source and reassembled at the final destination. This is generally accomplished through the use of the More Fragments (MF) flag in the IP header, combined with the Fragment Offset value. The receiving host must collect all pieces of the fragmented datagram, reassemble them into the proper sequence, and ensure that the complete datagram has been produced before passing the datagram onto the rest of the protocol stack for processing.

If reassembly is not completed within a predetermined period of time, the first fragment will generate an error message (for example, an ICMP error message described more fully in RFC 792), that will be returned to the originating host. This error message may contain an explanation of the error, in this case a timeout, a copy of the original IP header, and often the first 64 bits or other amount of the data payload. Generally, only the first fragmented piece of the datagram will generate an error as all other resources are generally discarded during error recovery.

These types of standardized behavior patterns are necessary for the dependable operation of a network. It is these dependable and regimented responses that may be utilized to trigger actions that are unexpected.

For a number of reasons, it may be desirable to covertly store a payload of data within a network. The present disclosures provide systems and processes where a payload of information may be stored within a network using a blind host as the storage location. The blind host may be kept unaware of its temporary involvement and no indication of the origin of the data may be provided or made available. This storage may be utilized with a ring of confederate hosts, thereby extending the storage of data from short term to an essentially indefinite length without revealing the existence of the data, nor the origin of its creation.

These systems and methods may utilize the blind host's requirement to produce error messages, such as but not limited to an ICMP message, when the blind host fails to reassemble a fragmented datagram. The origin host may create a datagram comprising a payload of information that is destined to be sent to a confederate host. However, the origin host may direct the traffic to the blind host, who may store the datagram for a period of time while waiting for the rest of the datagram to arrive. After a timeout period, the blind host may construct the error message, such as but not limited to an ICMP error message, which may contain the payload, and transmit the error message to the confederate host. The confederate host may repeat the same or similar operation, and may restore the payload in a second blind host on the way to other confederate hosts in a ring of confederates.

By using this blind bounce back technique, it is possible to covertly store a payload of data in a network of blind hosts, which may be sustained by a ring of confederate hosts. In this way, the payload may be covertly secured with an unaware blind host such that the existence or origin of the payload may not be revealed at any point within the confederate ring.

Covert storage of data payloads within a network, such as an IP network, may be accomplished by exploitation of ICMP error messages. Systems and methods are provided which permit detection of such techniques, such as for identification, and possible elimination of, the covertly stored packets, such as while as they are moved through a network. The systems and methods may be configured to monitor for non-observance of a portion of error data. Because a blind host may be utilized for this process, the disclosed systems and methods may be applied by the blind host(s) to ensure that their resources are not being used for such activity.

In exemplary embodiments, one or more blind hosts may be configured to monitor for patterns of digital behavior that fit into a method for concealment which exploits error messages, such as those issued in accordance with ICMP protocols. In exemplary embodiments, such blind host(s) may be configured to monitor for one or more of: 1) occurrence of the error messages with a regularity that is above a natural statistical average for the network; 2) error messages, some or all of which are formatted identically to, or substantially identical to, one or more prior error messages, especially where the error message is occurring at a regular interval; and/or 3) error messages which appear to have arrived from a different location within the network than where the error message is configured to be sent back to. Such analysis may take place in substantially real-time, or after such network activity has occurred. Alerts, notifications, or the like may be automatically generated and/or transmitted upon detection of the same. Such identified messages may be eliminated, or altered to remove the covert payload and permitted to continue transmission, such as so that other confederates or blind hosts in the ring may be identified.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 6 is a flow chart with other exemplary logic for detecting covertly stored payloads of data within the network.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
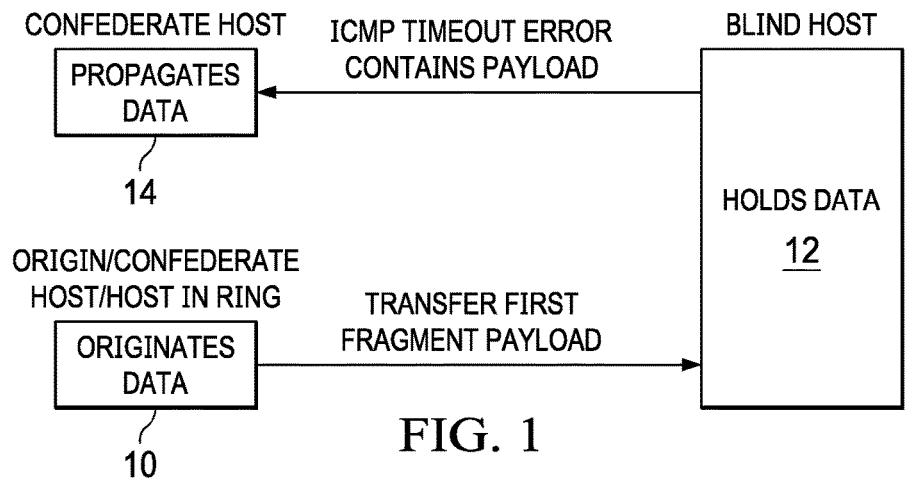
FIG. 1 is a simplified block diagram of an exemplary short-term storage solution.

FIG. 1 is a simplified block diagram of an exemplary short-term storage solution. An origin host 10 may comprise a host machine on a network. The network may be any type of network, or combination of networks, such as but not limited to, an IP network. The network may comprise the world wide web, an internet, an intranet, cellular network, some combination thereof, or the like. The host machines may comprise personal computers, tablets, smartphones, servers, some combination thereof, or the like. The origin host 10 may operate, at a minimum, simply as a host and does not necessarily need to operate as a gateway, though such is possible and considered to be within the scope of the present disclosures. The origin host 10 may originate the data for covert storage which is transmitted to a confederate host 14, though the data may be uploaded or otherwise transferred to the origin host 10. The confederate host 14 may be configured to store the data in a covert manner such that the data is practically, or entirely, undetectable. The origin host 10 may, alternatively or additionally, be configured to store the data in a covert manner which is practically, or entirely, undetectable. The confederate host 14 may be configured to remain substantially undetected and may be configured to initiate the covert long- or short-term storage of the data as further described herein. Any length of storage may be utilized.

Figure 2:
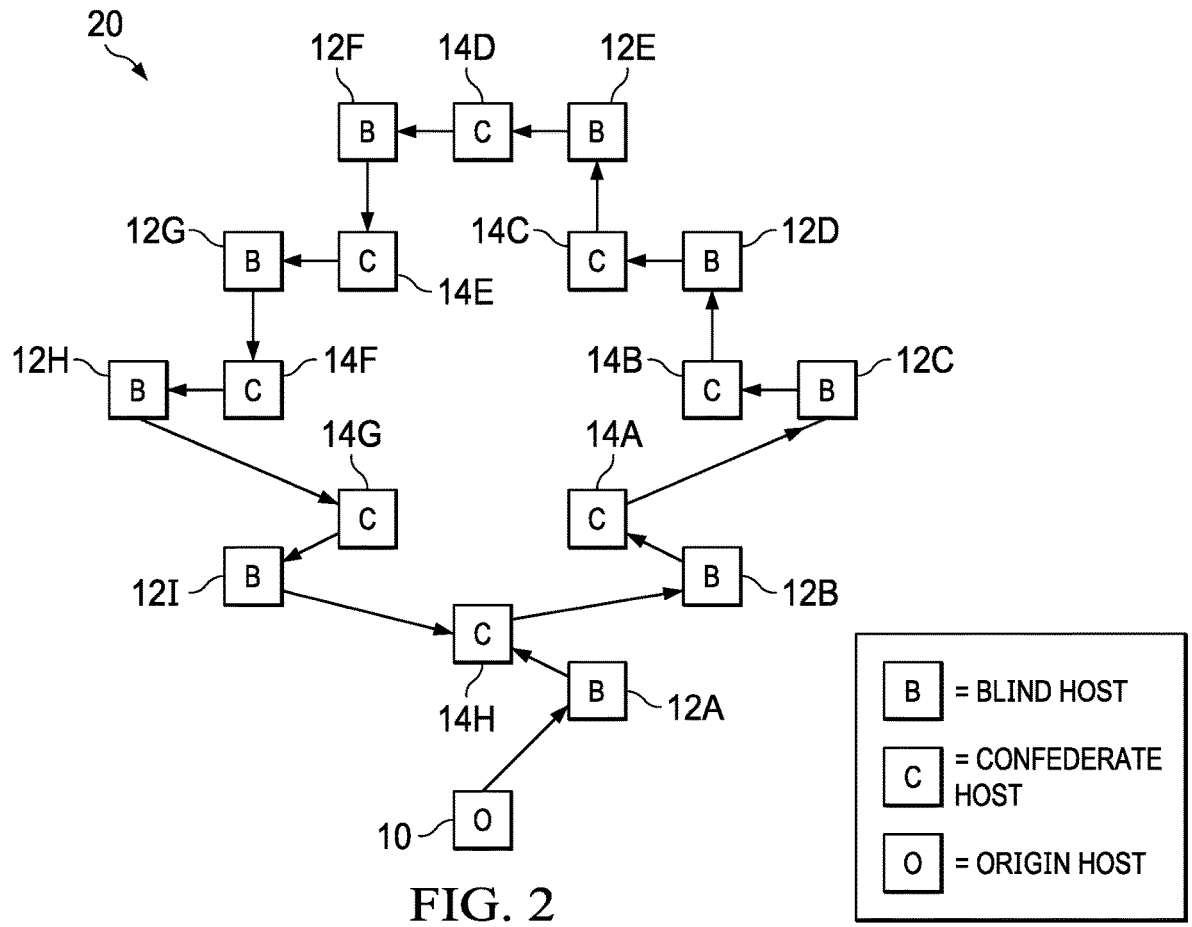
FIG. 2 is a simplified block diagram of an exemplary long-term storage ring.

FIG. 2 is a simplified block diagram of an exemplary long-term storage ring. The confederate host 14 may be a host machine on the network. The confederate host 14 may operate, at a minimum, simply as a host and does not necessarily operate as a gateway, though such is possible and considered to be within the scope of the present disclosures. The confederate host 14 may be a machine which is part of a ring of hosts 20. The confederate host 14 may periodically be the recipient of data intended for covert storage. The confederate host 14 may be configured to propagate the covert data to another confederate host 14A-14H within the ring of hosts 20. At no point does any confederate host 14A-14H have information about the origin of the covert data or any other confederate host 14A-14H, with the exception of the next host in the ring 20. However, because the origin of the covert information that is received by the next host is undetectable, the confederate host 14A-14G only knows where to send the covert information for continued long-term storage, and not from where it originated, thus preserving the covert nature of the data.

The blind host 12 may be a host machine on the network. The blind host 12 may operate as a correctly implemented IP host. The blind host 12 may conform to both RFC 791 and RFC 792, for example without limitation. Furthermore, the blind host 12 may have, or create, a transmission path to both the next confederate host 14A-14H in the ring 20 as well as the origin host 10. Each confederate host 14A-14H may have, or create, a transmission path to the next blind host 12A-12I to complete the ring 20. These transmission paths do not need to be on the same electrical and/or wireless path, but must be reachable for purposes of local or connected gateway operations. The blind host 12 does not need to have previous knowledge of the other hosts 10, 12A-12I, and 14A-14H or any further interactions after the covert information has been sent to the next confederate host 14A-14H.

Figure 3:
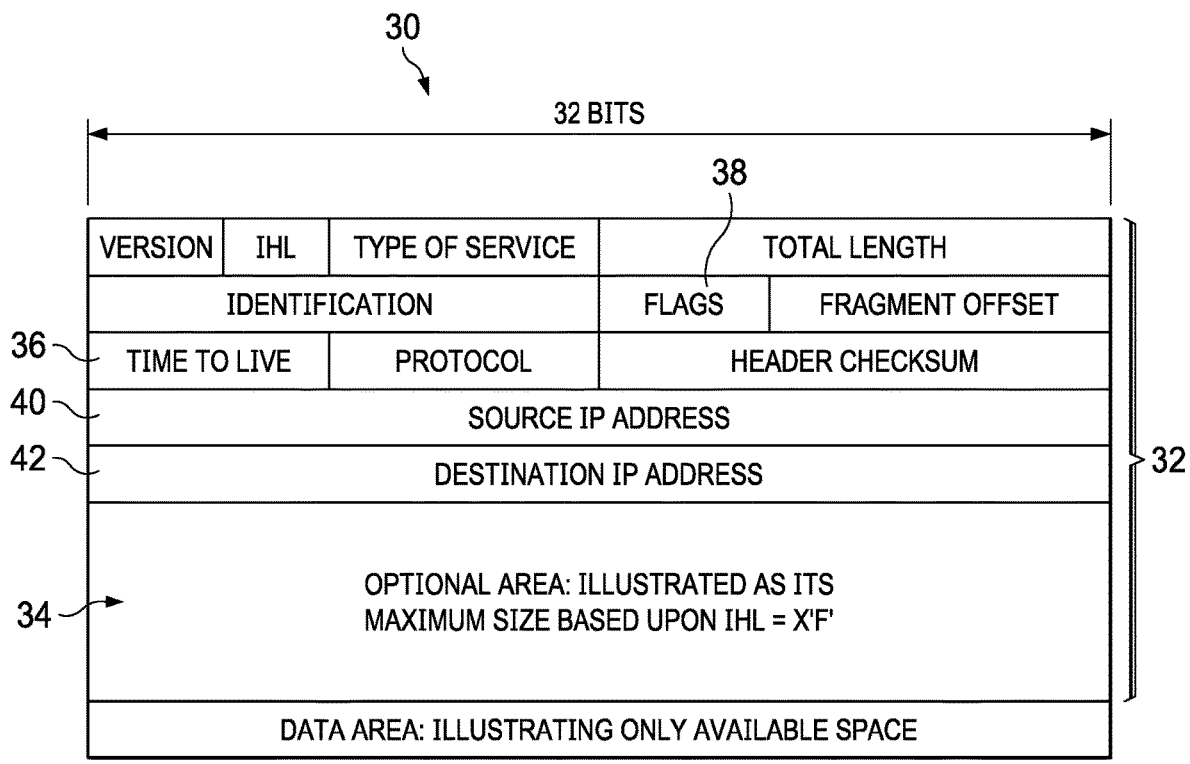
FIG. 3 is a simplified block diagram of an exemplary datagram fragment.
Figure 4:
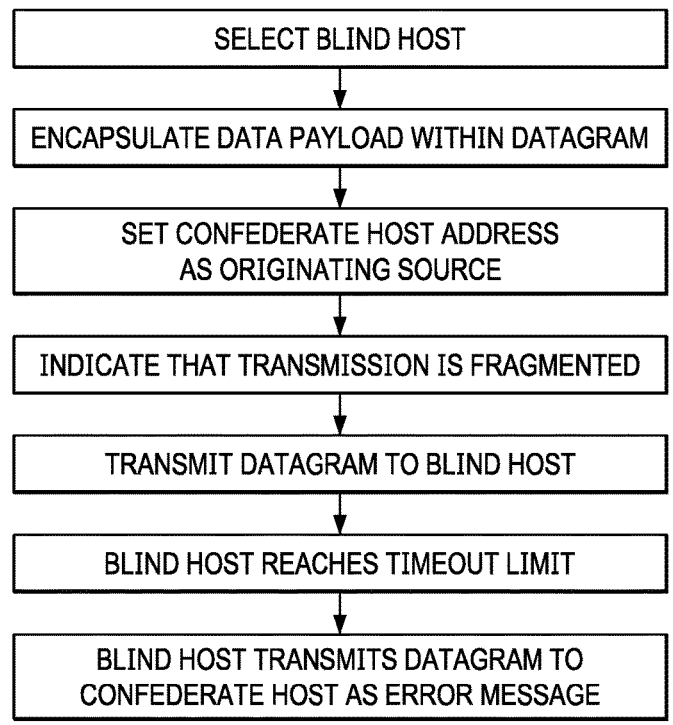
FIG. 4 is a flow chart with exemplary logic for covertly storing the payload of data within a network.

FIG. 3 is a simplified block diagram of an exemplary datagram fragment 30 and FIG. 4 is a flow chart with exemplary logic for use with the IP datagram fragment 30. There are several specific system configurations which may be provided, though are not necessarily required, to achieve storage of covert information. Alternatively, or additionally, there are several specific steps that may be performed, though are not necessarily required, to achieve storage of covert information. Several exemplary system attributes and/or process steps are provided below. However, such attributes and/or steps are exemplary and are not intended to be exclusive. Furthermore, such steps may be repeated or performed in any order.

1. A blind host 12 may be selected which implements the network layer protocol. In exemplary embodiments, the network is an IP network and the network layer protocols are defined by at least RFC 791, and the ICMP protocol, preferably, as defined by at least RFC 792.

2. The blind host 12 may be reachable from the origin host 10 of the covert information for storage or from a propagator of that information.

3. The covert information may be encapsulated within a datagram fragment 30 such as, but not limited to, the datagram format of FIG. 3. The datagram fragment 30 may be formatted, at least in part, as described in RFC 791, though such is not required. The covert payload may be limited in size and location. The covert payload may be wholly contained within the header 32 or within the optional area 34 that immediately follows the header 32 of the datagram fragment 30. While the operational area 34 might initially seem a rather restrictively small amount of payload, there is ample room within the optional area 34 of the header itself 32. An exemplary maximum amount of payload area is illustrated in FIG. 3, though any size and format datagram fragment 30 may be utilized. For example, without limitation, with the full optional area 34 and 64 bits following the header 32, a total payload of 12 full words, or 48 bytes, may be available for the covert payload. The datagram fragment 30 may be formatted for use on an IP network, though formatting for other types and protocols may be utilized.

4. The originating or propagating host 10 may be configured to construct a header 32 for the datagram fragment 30 to contain the covert information. This header 32 may be configured to trigger predetermined events based on certain communication protocols, system rules, and the like, such as but not limited to, the mechanisms of RFC 791 and RFC 792. The header 32 may be constructed to force the blind host 12A-12I, who is designed to follow certain protocol rules, into operating in a way that, unknown to the blind host 12A-12I, facilitates the covert storage of the payload. In this way, the blind host 12A-12I may become an unknown, and potentially unwilling, participant in the operation. Furthermore, the disclosed systems and processes may provide the ability to store covert information within the network without revealing the storage existence or the origin of the covert data if the covert data is somehow discovered.

The following additional system configurations and/or steps may be adhered to in exemplary embodiments. Several additional exemplary system attributes and/or process steps are provided below, though are not necessarily required. However, such additional attributes and/or steps are exemplary and are not intended to be exclusive or otherwise limiting. Furthermore, such additional steps may be repeated or performed in any order.

A. The source address 40 of the datagram 30 may identify the address of the next confederate host 14A-14H in the ring 20. The addresses may be IP addresses, though other identifiers may be utilized alternatively or in addition. When the believed to exist additional fragments of the full datagram (those indicated by the datagram 30 to be coming) never arrive, the blind host 12A-12I may be forced by protocol rules to send an error message. That error message may be directed to the source address 40—i.e., the next confederate host 14A-14H in the ring 20. In this way, the blind host 12A-12I may receive a transmission that the blind host 12A-12I will eventually determine is in error. Following the ICMP rules, or other preconfigured protocol rules, the blind host 12A-12I may generate and send an error message back to the host the blind host 12A-12I believes created the error in the first place. However, because the confederate host's 14A-14H address is contained in the source address field 40 of the received datagram 30, the blind host 12A-12I, following protocol, may assume that the confederate host 14A-14H is the originator of received transmission and may report this detected error to that address, thereby unwittingly delivering the covert information to the next confederate host 14A-14H in the ring 20 as the covert information will be contained within the transmission determined by the blind host 12A-12I to be erroneous.

B. The destination address 42 may identify the address of the next blind host 12A-12I in the ring 20. In this way, the protocol functions may be utilized in a way which operates to achieve the objective of covert storage. The origin host 10, or another propagating confederate host 14A-14H, may utilize the blind host 12A-12I as an unwitting storage location for short-term storage of the covert information. This may be accomplished by transmitting a fragment 30 purported to be part of a larger datagram. Since this fragment 30 is directed at the blind host 12A-12I, the blind host 12A-12I may store the fragment 30 as the blind host 12A-12I waits to receive all the purported additional fragments of the datagram for reassembly and processing because it may not be possible for the blind host 12A-12I to process the fragment 30 until the complete datagram has been received and reconstructed. Only when the full datagram is complete may the blind host 12A-12I be able to examine the datagram for distribution and action. However, since the blind host 12A-12I may only receive the first fragment 30 of the purported datagram, the blind host 12A-12I may store the fragment 30 until the timeout period is reached. Once a fragmentation timeout period is reached or exceeded, the blind host 12A-12I may be configured to construct an error message containing the covert information from the fragment 30 and transmit the fragment 30 with the covert information to the believed-to-be source of the fragment 30—i.e., the next confederate host 14A-14H in the ring 20. The blind host 12A-12I may be configured to discard the unused fragment 30 as an erroneous or incomplete transmission.

C. The more fragments (MF) message may be indicated in the flags 38 section of the header 32 of the fragment 30 by the originating host 10. The MF message may engage the fragmentation routines of the blind host 12A-12I, as described herein. For example, without limitation, the MF message may cause the blind host 12A-12I to store the datagram fragment 30 as it awaits the purported arrival of additional fragments, and when those fragments never arrive, may trigger the blind host 12A-12I, according to protocol, to send a copy of the fragment 30 to the source address 40 (i.e., the next confederate host 14A-14H), and delete its copy of the fragment 30.

D. The time to live field 36 of the header 32 of the fragment 30 may be an important control over the length of the storage of the covert information. This field may be decremented by one for every transition the datagram fragment 30 makes through gateways, though such is not required. However, once the fragment 30 arrives at the blind host 12A-12I, the protocol functions may control the fragment's 30 use and operation. For example, without limitation, the blind host 12A-12I may be configured to follow RFC 791, which provides that "if the timer runs out, then all the reassembly resources for the buffer identifier are released. [An ICMP error message regarding the condition of the timer occurrence is sent to the confederate host.] The initial setting of the timer is a lower bound on the reassembly waiting time. This is because the waiting time will be increased if the Time to Live in the arriving fragment is greater than the current timer value but will not be decreased if it is less. The maximum this timer value could reach is the maximum Time to Live (approximately 4.25 minutes)." However, other protocols or system rules may be utilized.

The short-term solution illustrated in FIG. 1 demonstrates how covert information may be stored for a length of time controlled by the time to live 36 value provided in the fragment 30. Such storage may occur within a blind host 12A-12I which is unaware of the storage operation or the origin of the information. Because the blind host 12A-12I is only aware of the address of the confederate host 14A-14H as indicated in the source address field 40 of the datagram 30, it is possible to create the ring of hosts 20. An exemplary ring 20 is illustrated in FIG. 2. As long as any given confederate host 14A-14H is only aware of the next confederate host 14A-14H in the ring 20, it is possible to covertly transfer information indefinitely around the ring 20 through the use of a series of unsuspecting blind hosts 12A-12I and confederate hosts 14A-14H. In this way, storage of the covert payload may be continued for any length of time. Each blind host 12A-12I in the ring 20 is unaware of their storage and involvement and is also only aware of the next confederate host 14A-14H to transfer the fragment 30 to and not the originating host 10 of the fragment 30 comprising the covert data.

The use of a series of blind hosts 12A-12I renders detection practically impossible because the unwitting blind hosts 12A-12I may also be randomly selected and may be changed for every point in the ring 20. Furthermore, the blind hosts 12A-12I and confederate hosts 14A-14H may be periodically changed. The fragment 30, in exemplary embodiments, is never stored within a confederate host 14A-14H as the confederate hosts 14A-14H are only used to propagate the fragment 30 with the covert data forward and remain unaware of any other confederate hosts 14A-14H except for next confederate host 14A-14H in the ring 20. Since the communication between these two confederate hosts 14A-14H is done through the use of the blind host 12A-12I, knowledge of the source and dimensions of the total ring 20 are not available.

While a certain number of blind hosts 12A-12I and confederate hosts 14A-14H are shown and described herein, any number of blind hosts 12A-12I and confederate hosts 14A-14H may be utilized to form any size ring 20 or other communication pathway. Furthermore, the blind hosts 12A-12I and confederate hosts 14A-14H may be periodically changed or substituted such that the ring 20 is periodically changed in composition, size, and/or configuration. While a ring 20 is described, any linkage pathway of hosts 10, 12A-12I, and 14A-14H may be utilized. The ring 20 may change size, shape, and number of participants over time. Furthermore, the blind host 12 may also serve as a confederate host 14A-H.

Figure 5:
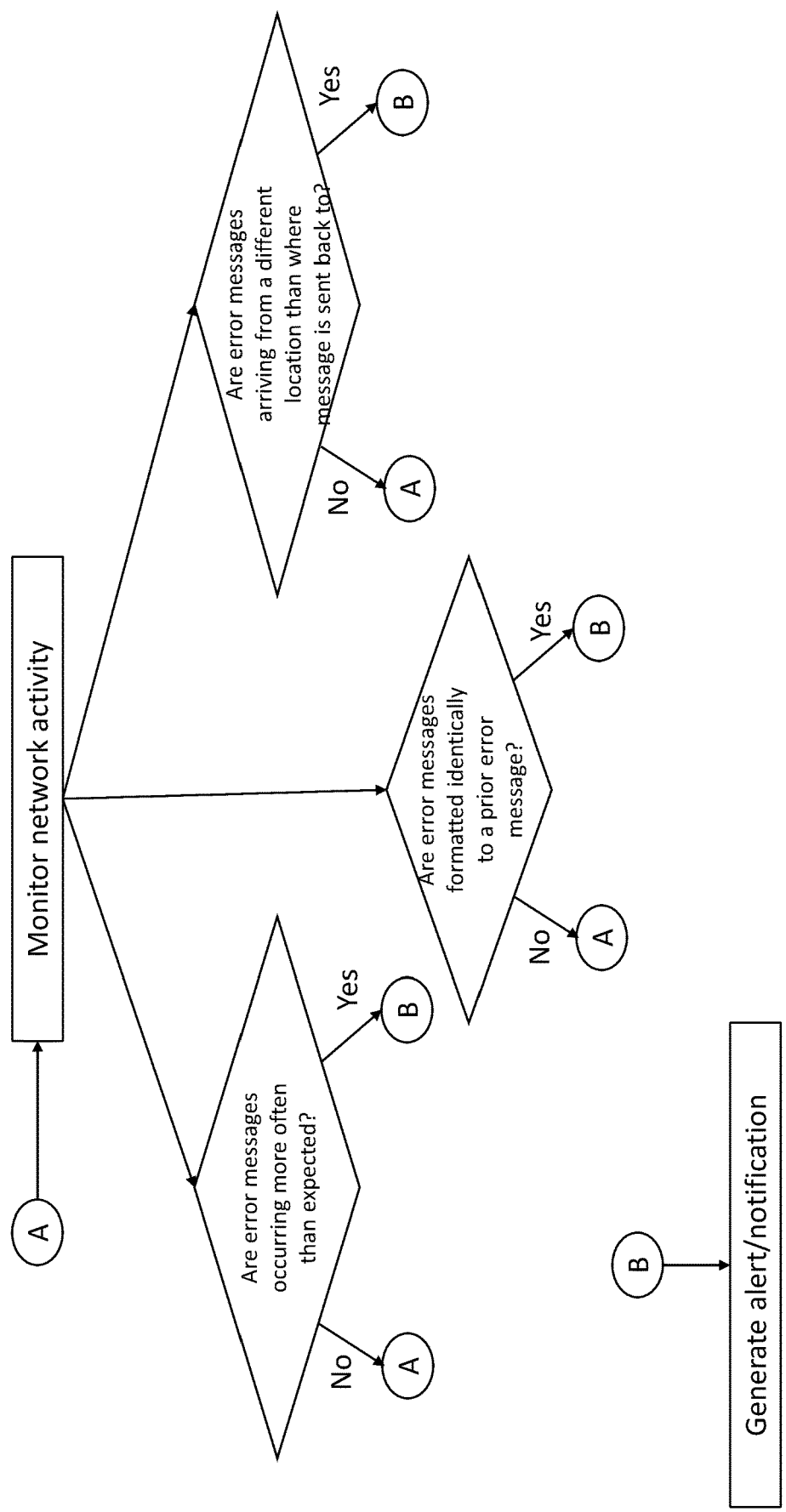
FIG. 5 is a flow chart with exemplary logic for detecting covertly stored payloads of data within the network.

FIG. 5 and FIG. 6 provide exemplary logic for detecting covertly stored data payloads within a network comprising one or more of the rings 20. Because techniques used to covertly store data payloads within the one or more rings 20 may be executed in a manner which is intended to prevent detection, careful monitoring and analysis may be required for detection. Furthermore, because techniques used to covertly store data payloads within the one or more rings 20 may be executed in a manner in which the blind host(s) 12 are unaware of their involvement, it may be desirable to implement such detection techniques on the blind hosts 12 to monitor for such exploitation, potentially to identify and eliminate such activity from the network and/or identify confederate host(s) 14.

The technique used to covertly store data payloads within the one or more rings 20 may exploit error messages and network protocols, such as ICMP error messages generated under IP network protocols, to contain and/or transmit the payloads, and may especially utilize one or more blind hosts 12 that unwittingly participates in the storage and/or transmission of these payloads, such as part of the one or more rings 20. Furthermore, the long-term storage of the covert payloads may be dependent upon continual movement of the payloads through the one or more rings 20, such as in a looping behavior. Detection of such activity may be realized by observing repetitive error messages, which may be required by the concealment technique to reoccur within a looping pattern, such as illustrated by and/or described with respect to FIG. 2 in exemplary embodiments.

Network activity, particularly the generation and/or transmission of error messages, may be monitored over a period of time, continually, intermittently, combinations thereof, or the like. Such activity may be monitored at one or more monitoring devices, which may include, for example without limitation, one or more of the blind hosts 12, one or more other hosts (e.g., origin host 10, confederate hosts 14, another host on the network not necessarily part of the ring 20, etc.), intermediary devices (e.g., bridges, gateways, firewalls, sniffers, signal repeaters, etc.), remote devices (computers, servers, smartphone, etc.), combinations thereof, or the like. Analysis of such monitored data may be undertaken in substantially real-time, at a later time, combinations thereof, or the like. Data intended for covert storage within the rings 20 using such concealment techniques may be identified by the one or more of the following: 1) error messages occurring with a regularity that is above a natural statistical average for the network, with or without a margin of error; 2) error messages formatted identically, or similarly, to one or more pervious error messages, especially where such error messages occur at regular intervals; and/or 3) error messages appearing to arrive from a different location within the network than where the error message is supposed to be sent back to.

As shown with particular regard to FIG. 5, by way of non-limiting example, existence of each factor may be separately checked for at the same or different times. As shown with particular regard to FIG. 6, by way of non-limiting example, existence of each factor may be sequentially checked. While FIG. 6 illustrates a particular order for checking such factors, any order may be utilized. Furthermore, the presence of some or all of the factors may be checked. In exemplary embodiments, datagrams may only be identified as containing covert payloads where more than one of such factors are found, though such is not required such that the presence of even one factor may cause the datagram to be so identified.

As to item 1, by way of non-limiting example, the natural statistical averages for the network may be determined, such as on an automatic basis, by one or more criteria including, but not limited to, a number of hosts on the network, intended use of the network, historical information regarding network activity, combinations thereof, or the like. The margin of error, where utilized, may be any amount, such as but not limited to, a statistical deviation. As to item 2, by way of non-limiting example, error messages circulating the same covert payload within the ring 20 of the network may have common formatting in at least some aspects, including but not limited to, same or similar data stored in the header 32 and/or optional area 34 (e.g., covert payload), source 40 and destination 42 information, time to live 36, and/or flags 38, combinations thereof, or the like such as may be required to accomplish such long term storage of covert data payloads utilizing techniques shown and/or described herein. As to item 3, by way of non-limiting example, where source information 40 indicates a different address, such as that of a confederate host 14 in the ring 20, than where the datagram appears to arrive from, this may indicate intention to exploit the error message functionality to covertly store data.

The existence of such activity may be determined where any single one of such factors exists, where any combination of two or more such factors exist, and/or where all three factors exist. The monitoring device(s) may be configured to, such as on an automatic basis, generate and/or transmit an alert or other notification regarding the detection of such activity upon the detection of any single one of such factors, combination of two or more such factors, and/or all three factors. Such notifications may be displayed at the monitoring device(s) themselves and/or transmitted to one or more remote devices, such as may be associated with one or more network administrators, by way of non-limiting examples.

By collecting a pattern of digital behavior, it may be possible to systematically identify network traffic that contains covert payloads. While each individual pattern might be naturally occurring errors, the combination of two or more combined activities may be so unlikely that it most assuredly contains this type of covert information, for example.

In exemplary embodiments, the datagrams identified as comprising the covert payloads may be eliminated. Alternatively, the datagrams identified as comprising the covert payloads may be altered to remove the covert payloads and then permitted to resume transmission on the network, such as within the ring 20. In this manner, notice of such detection may be reduced or eliminated. This may permit further monitoring of such activity, which may permit identification of confederate and/or blind hosts, 14 and 12 respectively, within the ring 20.

In exemplary embodiments, because the destination address 42 of such error messages with covert payloads may be set for a confederate host 14, the destination address 42 information from such error messages identified as containing covert payloads may be recorded and utilized, such as for eliminating such confederate hosts 14 from the network. Alternatively, or additionally, address information for receiving one of said hosts may be recorded and utilized, such as for further monitoring of blind hosts 12, back-tracing to the origin host 10, combinations thereof, or the like.

Software sufficient to accomplish such detection, notification generation, elimination of such datagrams, and/or modification of such datagrams may be provided or installed at each of the blind hosts 12 of a network in exemplary embodiments.

While some aspects of the present disclosures are provided with respect to current internet protocols and standards, such is merely exemplary and is not intended to be limiting. The concepts described herein may be adapted for use with a variety of internet protocols, communications standards, system rules, and the like, whether currently known or developed in the future.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose or specialized computing devices. The electronic devices may be personal computers, smartphones, tablets, databases, servers, or the like. The electronic connections described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for detecting covert payloads of data within an internet protocol (IP) network, said method comprising the steps of:
   electronically and automatically monitoring activity of at least a portion of the IP network for datagrams comprising error messages; and
   electronically and automatically identifying a selection of said datagrams comprising said error messages occurring with a regularity above a predetermined threshold, wherein said predetermined threshold comprises a natural statistical average for the IP network.

2. The method of claim 1 wherein:
   said natural statistical average for the IP network is determined by one or more of: a number of hosts on said network and historical activity information for said IP network.

3. The method of claim 1 wherein:
   said predetermined threshold comprises a margin of error.

4. The method of claim 1 further comprising the steps of:
   isolating said selection of said datagrams; and
   eliminating said selection of said datagrams from said IP network.

5. The method of claim 1 wherein:
   the network activity is monitored on a continual basis for a period of time.

6. The method of claim 1 further comprising the steps of:
   generating a notification regarding said selection of said datagrams; and
   transmitting said notification to one or more remote devices.

7. The method of claim 1 further comprising the steps of:
   identifying confederate hosts from destination address information in headers of said selection of said datagrams; and
   eliminating said confederate hosts from said IP network.

8. The method of claim 1 further comprising the steps of:
   identifying a sub-selection of said selection of said datagrams comprising at least one additional factor selected from the group consisting of:
      a format identical to at least one prior one of said error messages within said monitored activity; and
      arrival from a different address within the IP network than indicated in a source address of a header.

9. The method of claim 1 wherein:
   hosts of said IP network implement protocols complying with at least RFC 791 and RFC 792.

10. The method of claim 1 wherein:
    The error messages comprise internet control message protocol (ICMP) error messages.

11. The method of claim 1 wherein:
    said activity is monitored by a host of said IP network.

12. The method of claim 11 further comprising the steps of:
    forwarding datagrams within said monitored activity to at least one remote device, wherein said selection of said datagrams are identified by said at least one remote device.

13. The method of claim 11 wherein:
    said activity is monitored by each host of said IP network.

14. The method of claim 1 further comprising the steps of:
    removing said covert payloads of data from said selection of said datagrams.

15. The method of claim 14 further comprising the steps of:
    further monitoring said selection of said datagrams as transmitted within said IP network after removing said covert payloads to identify confederate and blind hosts within the IP network.

16. A method for detecting covert payloads of data within an internet protocol (IP) network, said method comprising the steps of:
    monitoring activity at one or more hosts of the IP network for datagrams comprising error messages;
    identifying a selection of said datagrams comprising said error messages as containing one of said covert payloads, wherein each of said selection of said datagrams comprise at least the factor of: said error messages of said selection of said datagrams occur with a regularity that is greater than a natural statistical average for the IP network with a margin of error; and at least one additional factor of:
       said error messages of said selection of said datagrams are formatted identically to at least one prior error message within said monitored activity; and
       said error messages of said selection of said datagrams indicate arrival from a different address within the IP network than indicated in source addresses of headers of said error messages of said selection of said datagrams;
    generating a notification indicating that said covert payloads of data are found within said IP network;
    altering said selection of said datagrams to remove said covert payloads; and
    monitoring further transmission of said altered datagrams within said network.

17. A system for detecting covert payloads of data within an internet protocol (IP) network, said system comprising:
    a number of hosts, each respective host comprising one or more processors and one or more electronic storage devices comprising software instructions, which when executed, configure said one or more processors to:
       monitor error messages generated by said respective host in response to datagrams received at said respective host; and
       identifying any of said received datagrams resulting in generation of said error messages with a regularity above a predetermined threshold, wherein said predetermined threshold comprises a natural statistical average for the IP network.

18. The system of claim 17 further comprising:
    additional software instructions stored at said one or more electronic storage devices, which when executed, configure said one or more processors to further identify any of said identified datagrams also comprising at least one additional factor selected from the group consisting of:

a format identical to at least one prior one of said error messages received at said receptive host; and arrival from a different one of said receptive hosts within the IP network not matching an address provided by a source address of a header of said datagram.

19. The system of claim 17 further comprising:

additional software instructions stored at said one or more electronic storage devices, which when executed, configure said one or more processors to:

alter said identified datagrams to remove said covert payload; and monitor further transmission of said altered datagrams through at least a portion of said IP network.

20. A method for detecting covert payloads of data within an internet protocol (IP) network, said method comprising:

monitoring activity of at least a portion of the IP network for datagrams comprising error messages;

identifying a selection of said datagrams comprising said error messages occurring with a regularity above a predetermined threshold;

isolating said selection of said datagrams; and eliminating said selection of said datagrams from said IP network.

21. The system of claim 17 further comprising:

additional software instructions stored at said one or more electronic storage devices, which when executed, configure said one or more processors to:

isolate said selection of said datagrams; and eliminate said selection of said datagrams from said IP network.

* * * * *